United States Patent
Jungwirth

(10) Patent No.: US 8,471,583 B1
(45) Date of Patent: Jun. 25, 2013

(54) SWITCHABLE DETECTOR ARRAY

(75) Inventor: Douglas Ralph Jungwirth, Reseda, CA (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 12/852,211

(22) Filed: Aug. 6, 2010

(51) Int. Cl.
*G01R 31/26* (2006.01)

(52) U.S. Cl.
USPC .................................... 324/761.01

(58) Field of Classification Search
None
See application file for complete search history.

(56) References Cited

U.S. PATENT DOCUMENTS

| | | | | |
|---|---|---|---|---|
| 4,122,383 A | | 10/1978 | Frosch et al. | |
| 7,411,408 B2 * | | 8/2008 | Shimotomai et al. | 324/754.23 |
| 7,528,615 B2 * | | 5/2009 | Shimotomai | 324/754.23 |
| 8,138,782 B2 * | | 3/2012 | Elgar et al. | 324/761.01 |
| 8,159,238 B1 * | | 4/2012 | Krasowski et al. | 324/713 |
| 2008/0298043 A1 * | | 12/2008 | Shimotomai et al. | 362/1 |
| 2010/0090616 A1 * | | 4/2010 | Yoshino et al. | 315/291 |
| 2011/0068817 A1 * | | 3/2011 | Hashimoto et al. | 324/761.01 |
| 2011/0148452 A1 * | | 6/2011 | Cherukupalli | 324/761.01 |
| 2011/0241719 A1 * | | 10/2011 | Shr et al. | 324/761.01 |
| 2011/0308602 A1 * | | 12/2011 | Junghanel et al. | 324/761.01 |

* cited by examiner

*Primary Examiner* — Jermele M Hollington
(74) *Attorney, Agent, or Firm* — Yee & Associates, P.C.

(57) ABSTRACT

A solar simulator is tested using a ceramic board having a number of circuits on the ceramic board, wherein one of the number of circuits contains a solar cell and each of a remaining number of the number of circuits contain a different solar cell isotype, and a number of resistors, each resistor configured for a specific circuit of the number of circuits when engaged by one of a number of switches. For each circuit, a current versus voltage curve for each circuit is made when a switch of the circuit is in an open position and a shunt resistor measurement is made when the switch of the circuit is in a closed position.

14 Claims, 13 Drawing Sheets

SWITCHABLE DETECTOR ARRAY

BACKGROUND INFORMATION

1. Field

The present disclosure relates generally to electronic testing equipment, and specifically to testing of solar simulators.

2. Background

Solar simulators reproduce radiation equivalent to sunlight when needed and without regard to time of day or weather. Many types of solar simulators are available. For example, one type of solar simulator comprises a high-pressure xenon arc lamp with filtration to reduce excessive infra-red and ultraviolet power.

Solar simulators provide a number of services. For example, a solar simulator may be used to check photovoltaic cell performance prior to assembly into solar panels. Other testing environments require solar simulators such as photochemical reactions, photobiology research, material degradation research, photo-toxicity, and color and material stability for textile, plastics and paints.

In addition to testing, solar simulators have taken on a significant role in the area of solar power. Once solar cells have been arrayed in solar panels, the solar panels may be used for power generation. However, the generation of power is subject to the incidence of sunlight which varies with the sun's passage and ends completely during the hours of darkness. Therefore, solar simulators are used to maintain a steady rate of power generation during a full twenty-four hour period.

In order to fulfill any of the foregoing roles, a solar simulator must provide a full spectrum of incident light that meets the specification for the particular application. The particular specification states the spectrum of the sunlight for the location of the solar panel. Thus a specification for a solar simulator simulating sunlight at noon in Montreal, Canada will be substantially different from a specification for a solar simulator providing artificial sunlight that simulates sunlight at noon in Panama City, Panama. Additionally, the altitude at which a solar panel may be located will affect the specification for the solar simulator.

In order to determine whether a solar simulator meets the specification it must be tested. Generally, at least two tests are required: a current versus voltage plot and a shunt resistor measurement. Testing may be time consuming and expensive because setting up the foregoing tests requires two different devices and changing the position of the test device changes the incidence of light.

Therefore, it would be desirable to have a method, apparatus, and computer program code that may overcome one or more of the issues described above, as well as other possible issues.

SUMMARY

An embodiment of the present disclosure provides an apparatus for testing a solar simulator, the apparatus comprising: a ceramic board, a number of circuits on the ceramic board, wherein one of the number of circuits contains a solar cell and each of a remaining number of the number of circuits contain a different solar cell isotype, and a number of resistors, each resistor configured for a specific circuit of the number of circuits when engaged by one of a number of switches. The apparatus plots a current versus voltage curve for each circuit when a switch of the circuit is in an open position and a shunt resistor measurement when the switch of the circuit is in a closed position.

An embodiment of the present disclosure provides a method for testing a solar simulator. The method provides a ceramic board with a number of circuits on the ceramic board, wherein one of the number of circuits contains a solar cell and each of a remaining number of the number of circuits contain a different solar cell isotype, provides a number of resistors, each resistor configured for a specific circuit of the number of circuits when engaged by one of a number of switches, plots, by a processor of a computer connected to the ceramic circuit board, a current versus voltage curve for each circuit when a switch of the circuit is in an open position, and makes a shunt resistor measurement, by the processor, when the switch of the circuit is in a closed position.

An embodiment of the present disclosure provides a computer program product, comprising: a non-transitory computer readable storage medium, first instructions for connecting a test device to a computer having a computer readable memory, the test device comprising a ceramic board with a number of circuits on the ceramic board, wherein one of the number of circuits contains a solar cell and each of a remaining number of the number of circuits contain a different solar cell isotype, and a number of resistors, each resistor configured for a specific circuit of the number of circuits when engaged by one of a number of switches; second instructions for opening a switch of one of the number of circuits; responsive to opening the switch, third instructions for plotting a current versus voltage curve for the one of the number of circuits, and fourth instructions for closing the switch, and responsive to closing the switch, fifth instructions for making a shunt resistor measurement.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
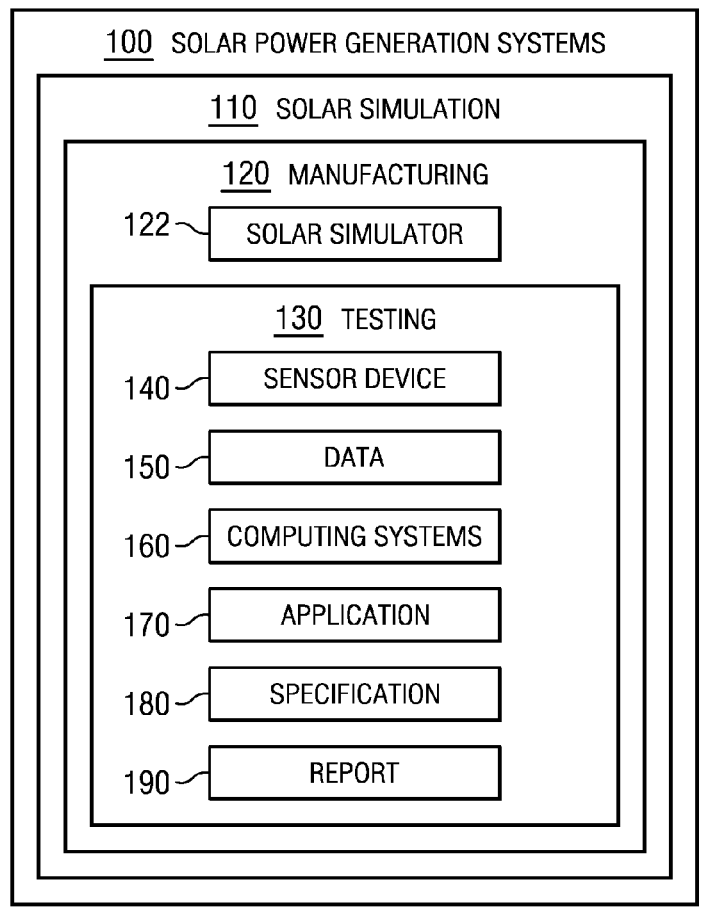
FIG. 1 is a block diagram of a solar power generation systems environment in accordance with an advantageous embodiment.

Referring to FIG. 1, block diagram of solar power generation systems environment 100 may provide in accordance with an advantageous embodiment. Solar power generation systems environment 100 comprises solar simulation 110. Solar simulation 110 comprises manufacturing 120. Manufacturing 120 comprises testing 130. Testing 130 comprises sensor device 140, data 150, computing systems 160, application 170, specification 180, and report 190. Sensor device 140 may be a printed circuit device as illustrated in the advantageous embodiments of FIGS. 2-9. Specification 180 may set forth the requirements for solar simulator 122, and sensor device 140 may be used to test solar simulator 122 to ensure that solar simulator 122 meets a number of requirements of specification 180.

As used herein, "a number" means one or more.

As used herein, "isotype" means a variation of a particular solar cell having a number of layers, the variation being the same as the particular solar cell with the exception that the variation is etched to connect only the electrical connections of a particular layer of the number of layers. As used herein, a solar cell is a solar cell that has all layers etched for connection. A "top isotype" is a variation etched to provide a connected top layer. A "middle isotype" is a variation etched to provide a connected middle layer. A "bottom isotype" is a variation etched to provide a connected bottom layer. In an advantageous embodiment, any number of isotypes may be created by etching any number of levels to connect only one of the number of levels.

The advantageous embodiments recognize and take into account that each isotype may be connected to a circuit to measure a power of the particular solar cell section under an incident light source. The advantageous embodiments recognize and take into account that by cutting portions of substantially identical solar cells, each of the resulting isotypes may be used to measure performance of the solar cell in response to incident light at a particular depth of the full solar cell.

The different advantageous embodiments recognize and take into account that a solar simulator may be tested by measuring sunlight at a location where a solar panel may be to be employed, and then measuring the light from the solar simulator and comparing the results across the spectrum to see if the measurements are substantially the same.

The different advantageous embodiments recognize and take into account that there are two common ways to measure critical parameters for a solar cell. The first method may be to measure current and voltage of the cell and to plot a current versus voltage curve. The second method measures voltage through a shunt resistor across the cell. The different advantageous embodiments recognize and take into account that neither test alone may be sufficient for testing a solar simulator.

Furthermore, different circuitry may be required to perform the different measurements are different. It would be convenient to have a detector that could perform either of these measurements without having to change detectors or moving the detector from that position. Similarly, these detectors are expensive, and it would be useful to have one detector that could perform both of these types of measurements with just minor alterations to the detector circuit.

The different advantageous embodiments recognize and take into account that there are two different types of solar cell testing configurations in order to perform two different tests. Each of the two tests may be necessary in order to determine whether a solar simulator provides a full spectrum of light that matches the full spectrum of natural light at a destination for the solar simulator and a solar panel.

The different advantageous embodiment recognize and take into account that each of the two tests must be made in the same physical position in a beam of the solar generator. Changing the testing device and positioning one device to measure the same incidence of light as the previous test may be costly and time consuming. Therefore, the different advantageous embodiments recognize the desirability of performing both measurements using a single test device that remains in the same physical position in the beam. The different advantageous embodiments recognize and take into account that such a single test device may require automated reconfiguration of the test device circuitry without moving the test device.

Figure 2:
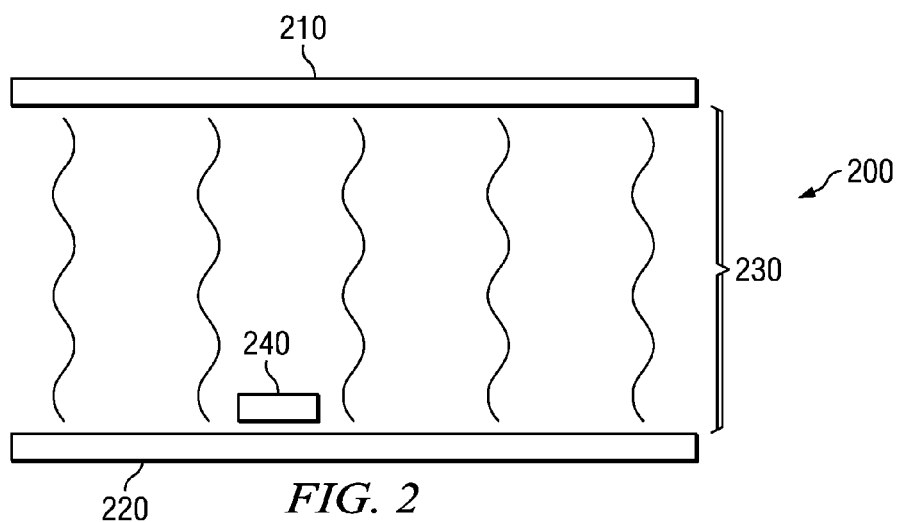
FIG. 2 is solar power system in accordance with an advantageous embodiment.

Referring to FIG. 2, solar power system 200 may be provided in accordance with an advantageous embodiment. Solar panel 220 receives light 230 from solar simulator 210. Test circuit 240 may be used to determine whether light 230 meets a specification such as specification 180 in FIG. 1.

Figure 3:
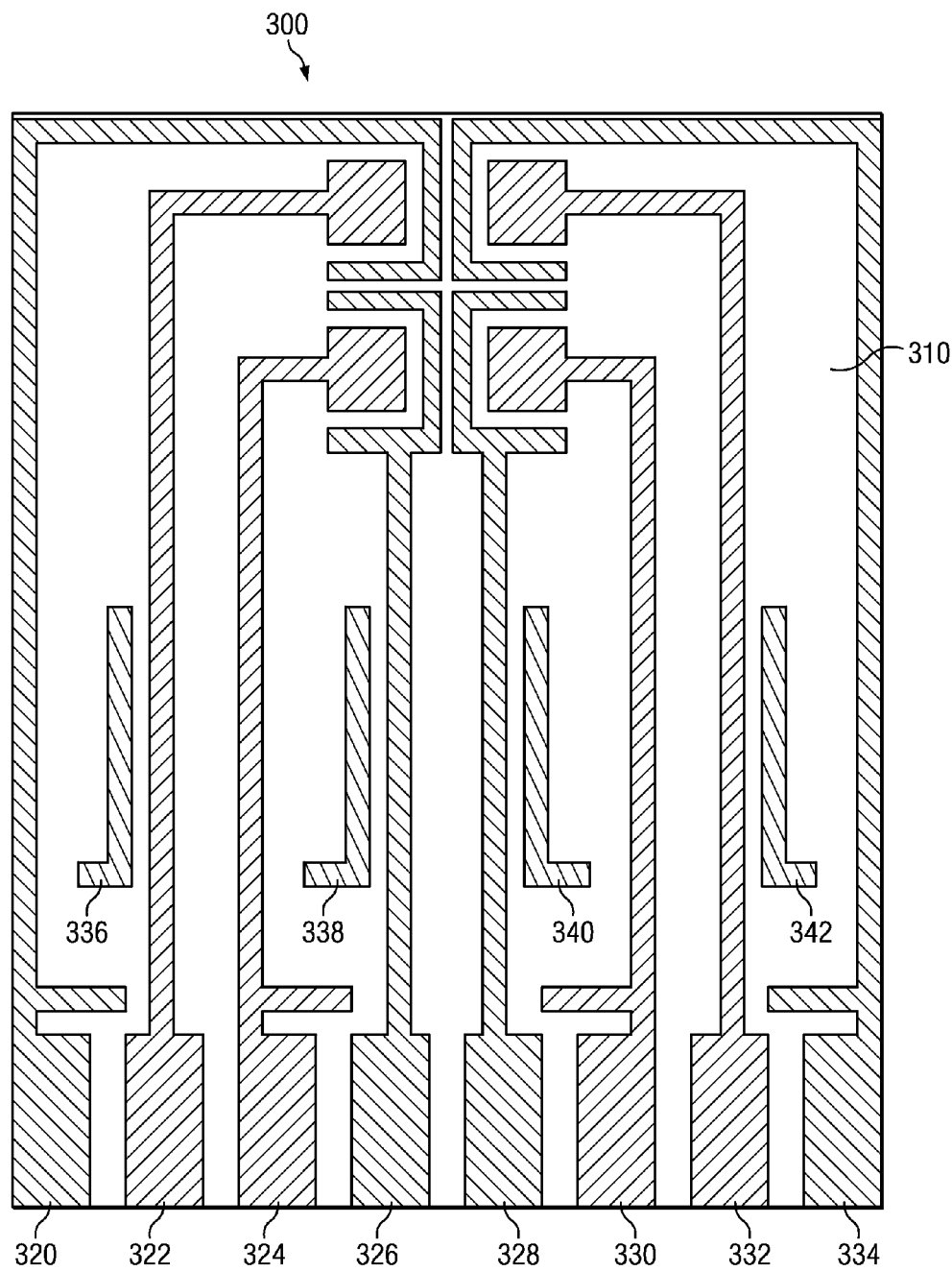
FIG. 3 is a printed circuit board in accordance with an advantageous embodiment.

Turning to FIG. 3, printed circuit board 300 may be disclosed in accordance with an advantageous embodiment. Printed circuit board 300 has substrate 310 and first conductor 320, second conductor 322, third conductor 324, fourth conductor 326, fifth conductor 328, sixth conductor 330, seventh conductor 332, and eighth conductor 334. In addition printed circuit board has first conductive trace 336, second conductive trace 338, third conductive trace 340 and fourth conductive trace 342.

First conductive trace 336 may electrically isolated and may be located between first conductor 320 and second conductor 322. Second conductive trace 338 may be electrically isolated and may be located between third conductor 324 and fourth conductor 326. Third conductive trace 340 may be electrically isolated and may be located between fifth conductor 328 and sixth conductor 330. Fourth conductive trace 342 may be electrically isolated and may be located between seventh conductor 332 and eighth conductor 334. First conductive trace 336, second conductive trace 338, third conductive trace 340 and fourth conductive trace 342 each have a generally square section for receiving a solar cell or solar cell isotype and a rectangular section for access by an electrical probe or connection to a computer.

Figure 4:
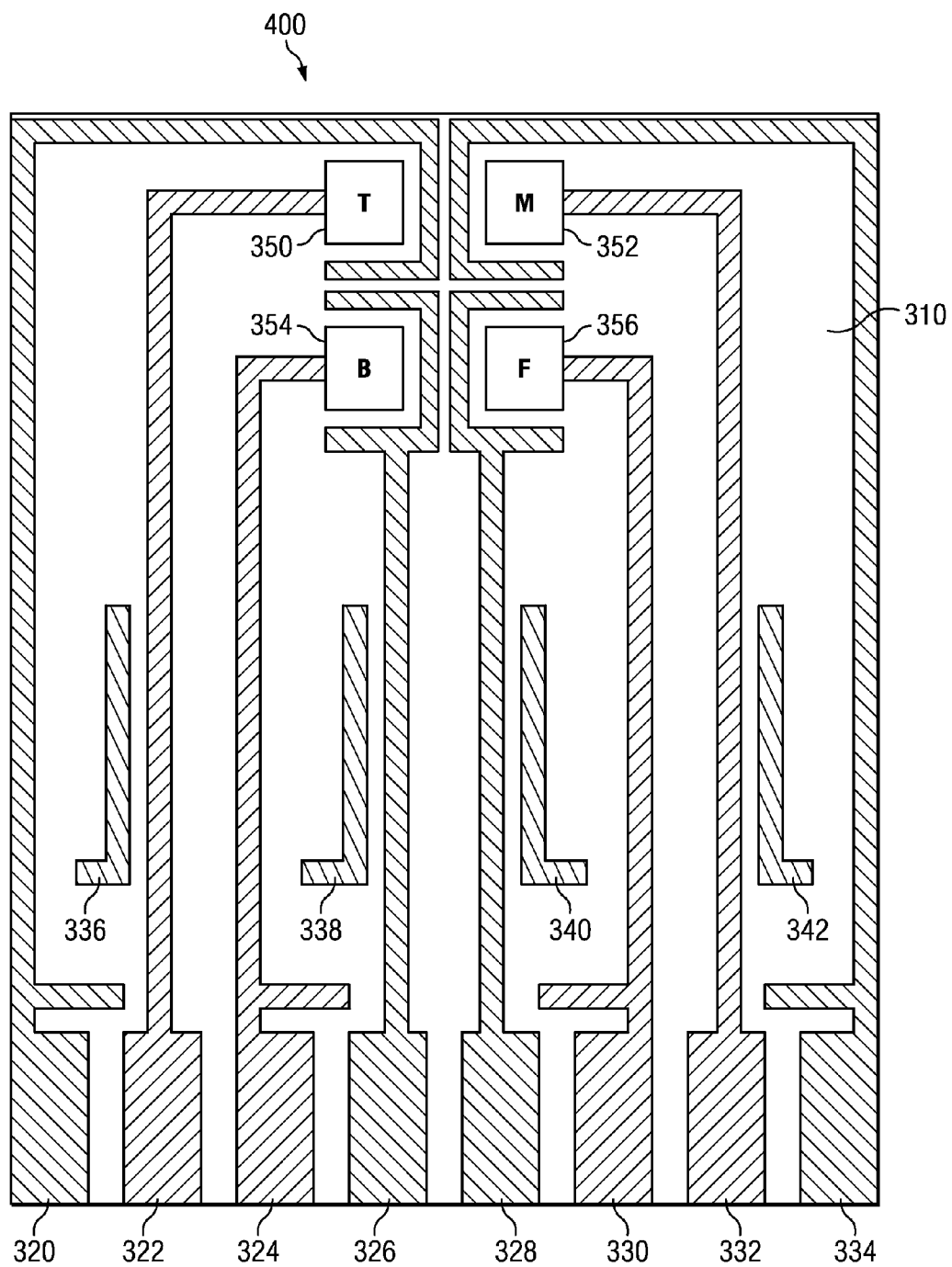
FIG. 4 is a printed circuit board with solar cell and solar cell isotypes in accordance with an advantageous embodiment.

Turning to FIG. 4, printed circuit board 400 has 352 solar cell 356 and solar cell isotypes 350, 352, and 354 in accordance with an advantageous embodiment. Printed circuit board 400 has substrate 310 and first conductor 320, second conductor 322, third conductor 324, fourth conductor 326, fifth conductor 328, sixth conductor 330, seventh conductor 332, and eighth conductor 334. In addition printed circuit board 400 has first conductive trace 336, second conductive trace 338, third conductive trace 340 and fourth conductive trace 342. In addition, printed circuit board 400 has solar cell 356 located on sixth conductor 330, bottom solar cell isotype 354 located on third conductor 324, top solar cell isotype located on second conductor 322 and middle solar cell isotype 352 located on seventh conductor 332.

Figure 5:
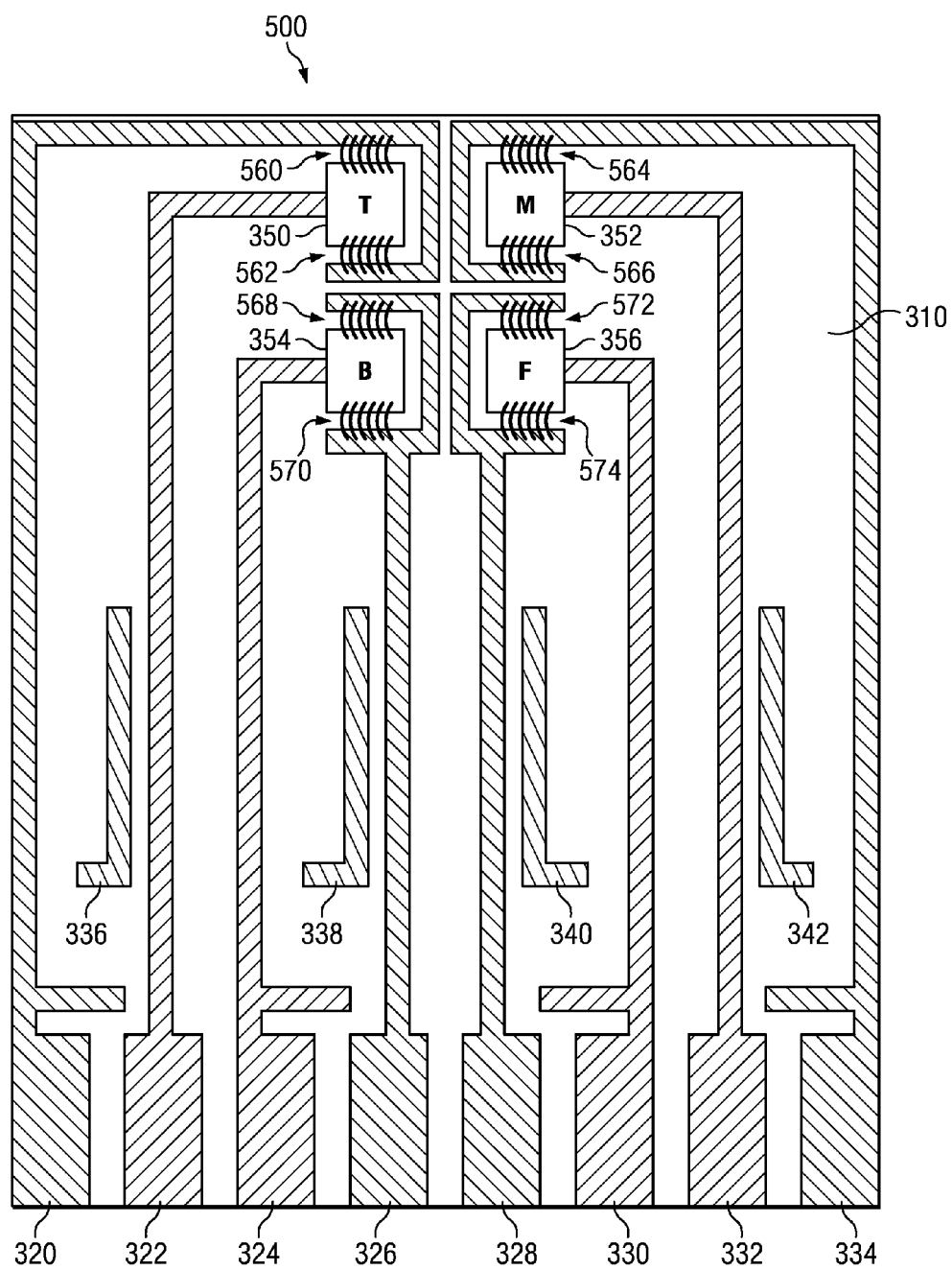
FIG. 5 is a printed circuit board with solar cell and solar cell isotypes wire bonded to form circuits in accordance with an advantageous embodiment

Turning to FIG. 5, printed circuit board 500 has solar cell 356 and solar cell isotypes 350, 352, and 354 may be wire bonded in accordance with an advantageous embodiment. Printed circuit board 500 may have solar cell 350 located on second conductor 322 and wire bonded to first conductor 320 by first wire bond 560 and second wire bond 568. Printed circuit board 500 has middle solar cell isotype 352 located on seventh conductor 332 and wire bonded to eighth conductor 334 by third wire bond 564 and fourth wire bond 566. Printed circuit board 500 has solar cell 356 located on sixth conductor 330 and wire bonded to fifth conductor 328 by fifth wire bond 572 and sixth wire bond 574. Printed circuit board 500 has bottom solar cell isotype 354 located on third conductor 324 and wire bonded to fourth conductor 326 by seventh wire bond 568 and eighth wire bond 570. In addition printed circuit board 500 has first conductive trace 336, second conductive trace 338, third conductive trace 340 and fourth conductive trace 342.

Figure 6:
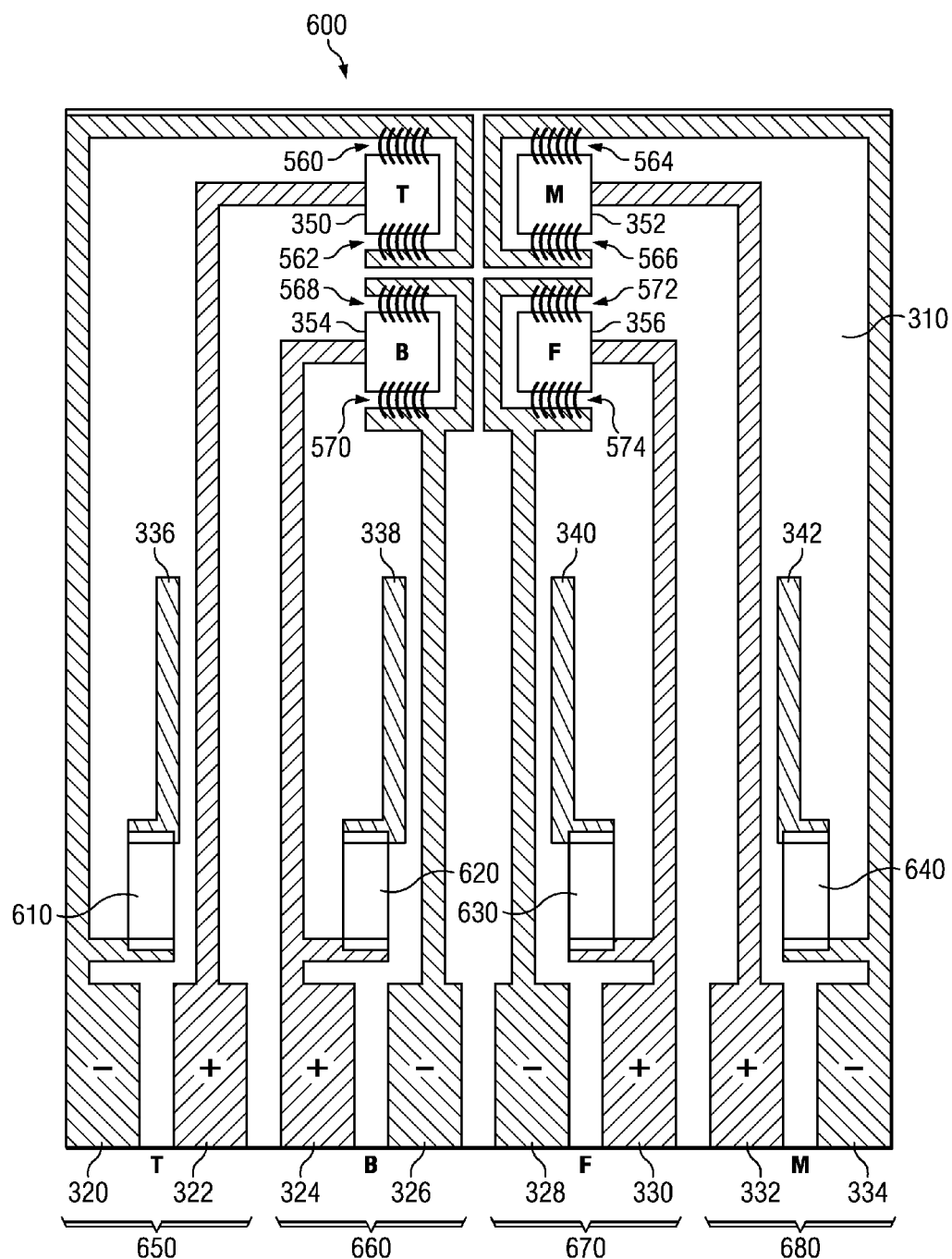
FIG. 6 is a printed circuit board with solar cell and solar cell isotypes wire bonded to form circuits, each circuit containing a resistor in accordance with an advantageous embodiment.

Turning to FIG. 6, printed circuit board 600 may be provided with solar cell and solar cell isotypes wire bonded to form circuits, each circuit containing a resistor in accordance with an advantageous embodiment. Printed circuit board 600 is configured as printed circuit board 500 described above with the addition of first resistor 610, second resistor 620, third resistor 630 and fourth resistor 640. First resistor 610 is electrically connected to first conductor 320 and to first trace 336 to form first circuit 650. First conductor 320 provides the negative terminal and second conductor 322 provides the positive terminal of first circuit 650. Measurements are taken from first circuit 650, second circuit 660, third circuit 670, and fourth circuit 680. The different advantageous embodiments recognize and take into account that measurements for both a first method and a second method for measuring critical parameters for a solar cell may be taken from first circuit 650, second circuit 660, third circuit 670, and fourth circuit 680. In an advantageous embodiment, the first method may be to measure current and voltage of the cell and to plot a current versus voltage curve, and the second method measures voltage through a shunt resistor across the cell.

Second resistor 620 may be electrically connected to third conductor 342 and to second trace 338 to form second circuit 660. Third conductor 324 provides the positive terminal and fourth conductor 326 provides the negative terminal of second circuit 660. Third resistor 630 may be connected to sixth connector 330 and to third trace 340 to form third circuit 670. Fifth conductor 328 provides the negative terminal and seventh conductor 330 provides the positive terminal of third circuit 670. Fourth resistor 640 may be connected to eighth conductor 334 and to fourth trace 342 to form fourth circuit 680. Seventh conductor 332 provides the positive terminal and eighth conductor 334 provides a negative terminal for fourth circuit 680.

Figure 7:
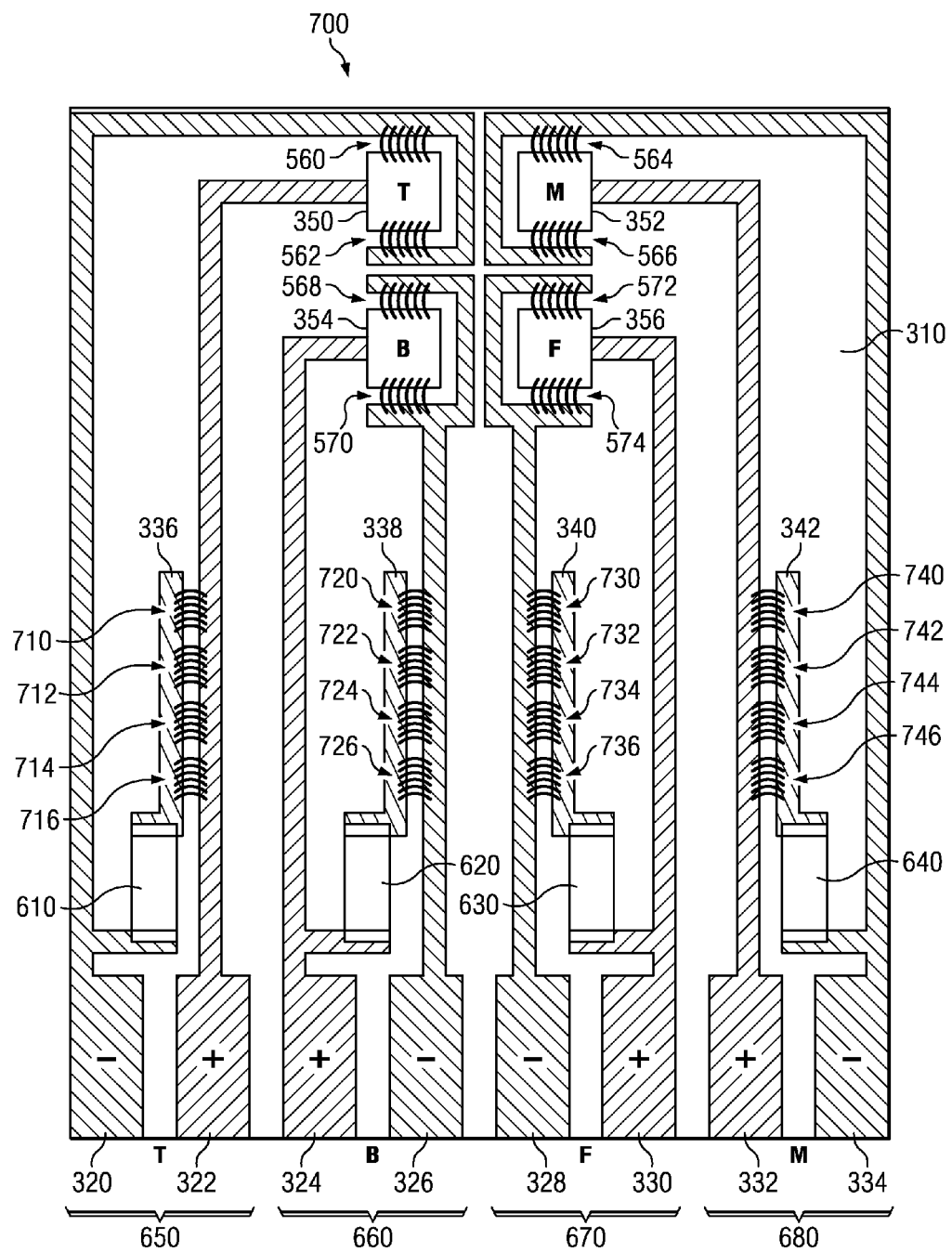
FIG. 7 is a printed circuit board with solar cell and solar cell isotypes wire bonded to form circuits, each circuit containing a resistor and a wire bond in each circuit forming a short.

Turning to FIG. 7, printed circuit board 700 may be provided with solar cell and solar cell isotypes wire bonded to form circuits, each circuit containing a resistor and a wire bond in each circuit forming a short. First circuit 650 has a first shunt comprising ninth wire bond 710, tenth wire bond 712, eleventh wire bond 714, and twelfth wire bond 716. Second circuit 660 has a second shunt comprising thirteenth wire bond 720, fourteenth wire bond 722, fifteenth wire bond 724 and sixteenth wire bond 726. Third circuit 670 has a third shunt comprising seventeenth wire bond 730, eighteenth wire bond 732, nineteenth wire bond 734, and twentieth wire bond 736. Fourth circuit 680 has twenty first wire bond 740, twenty second wire bond 742, twenty third wire bond 744 and twenty fourth wire bond 746. The advantageous embodiments recognize and take into account that the wire bonds in each circuit may be removed in order to provide an alternate measurement such as a first method measuring current and voltage of the cell and plotting a current versus voltage curve, and a second method measuring voltage through a shunt resistor across the cell. In an advantageous embodiment, the wire bonds may be removed from each circuit without moving the printed circuit board from its physical location.

Figure 8:
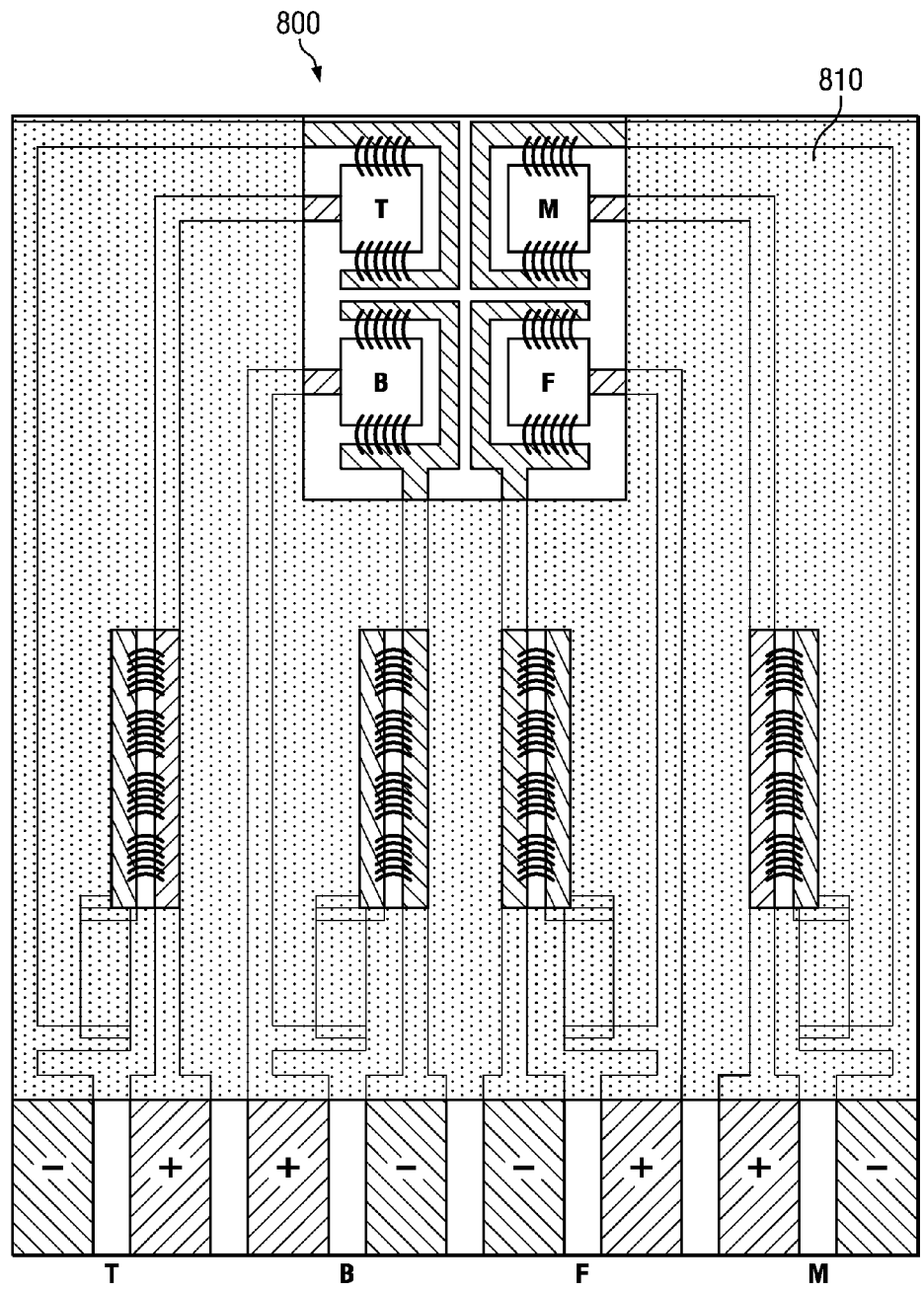
FIG. 8 is a printed circuit board with solar cell and solar cell isotypes wire bonded to form circuits, each circuit containing a resistor, a wire bond in each circuit forming a short, and a protective coating in accordance with an advantageous embodiment.

Turning to FIG. 8, printed circuit board 800 may be disclosed with solar cell and solar cell isotypes wire bonded to form circuits, each circuit containing a resistor, and a wire bond in each circuit forming a short, as shown in FIG. 7. In addition, printed circuit board 800 has protective coating 810 in accordance with an advantageous embodiment.

Figure 9:
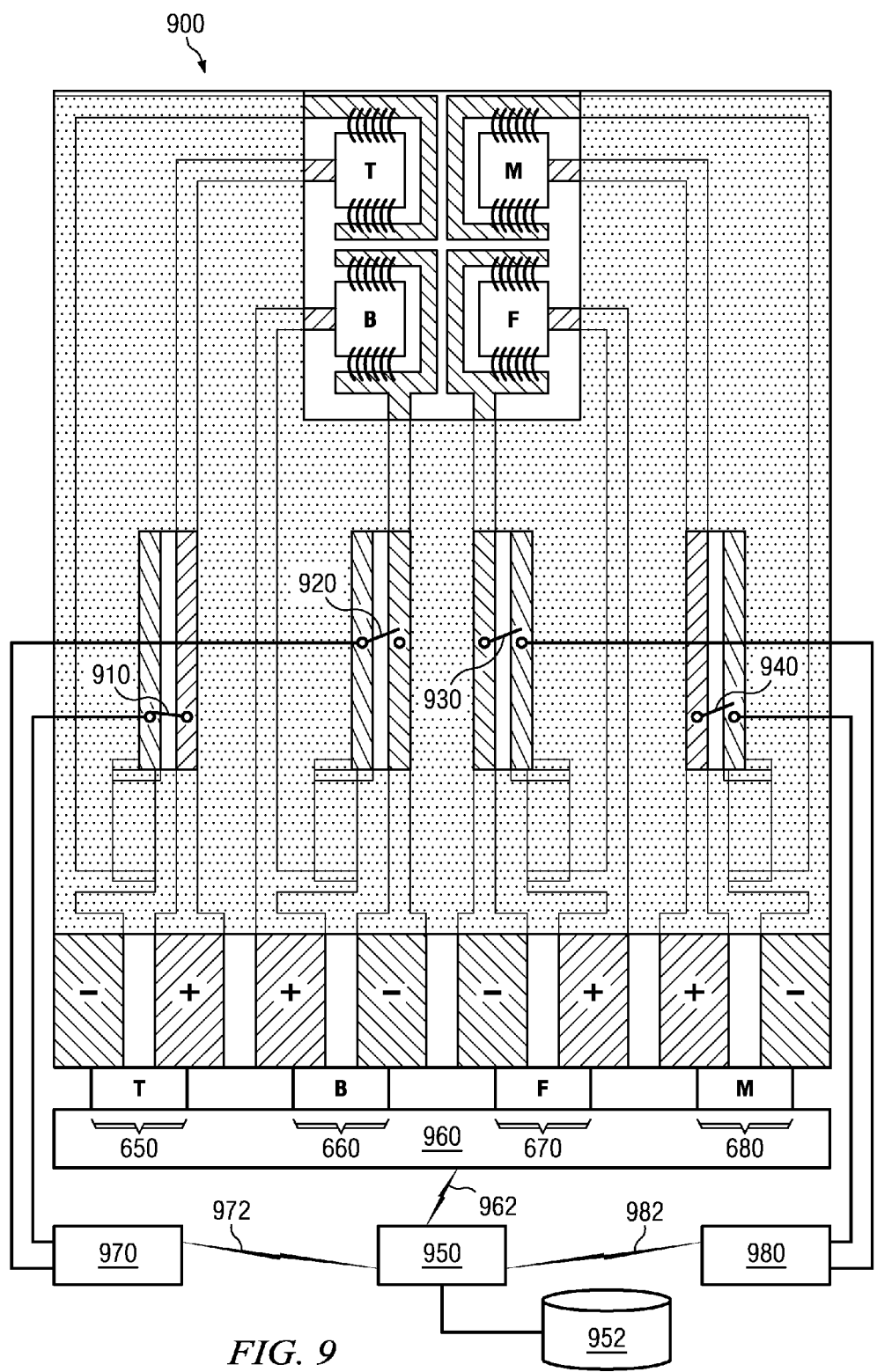
FIG. 9 is a printed circuit board with solar cell and solar cell isotypes wire bonded to form circuits, each circuit containing a resistor, a switch in each circuit configured to form a short when a switch is engaged, a protective coating in accordance with an advantageous embodiment.

Turning to FIG. 9, printed circuit board 900 may be provided with solar cell and solar cell isotypes wire bonded to form circuits, each circuit containing a resistor, a switch in each circuit configured to form a short when a switch may be engaged, and a protective coating in accordance with an advantageous embodiment as shown in FIGS. 7 and 8. First circuit 650, second circuit 660, third circuit 670, and fourth circuit 680 may be connected to first wireless device 960. First circuit 650 has switch 910. By way of example, switch 910 may be shown in a closed position. Second circuit 660 has first switch 910. Second circuit 660 has second switch 920. First switch 910 and second switch 920 may be connected to second wireless device 970. Third circuit 670 has third switch 930. Fourth circuit 680 has fourth switch 940. Third circuit 670 and fourth circuit 680 may be connected to third wireless device 980. First switch 910 may be connected to computer 950 by first line 912. Second switch 920 may be connected to computer 950 by second line 922. Third switch 930 may be connected to computer 950 by third line 932. Fourth switch 940 may be connected to computer 950 by fourth line 942. Computer 950 may be connected to first wireless device 960 by first wireless link 962. Computer 950 may be connected to second wireless device 970 by second wireless link 972, and to third wireless device 980 by third wireless link 982. Computer 950 may be connected to storage 952.

Figure 10:
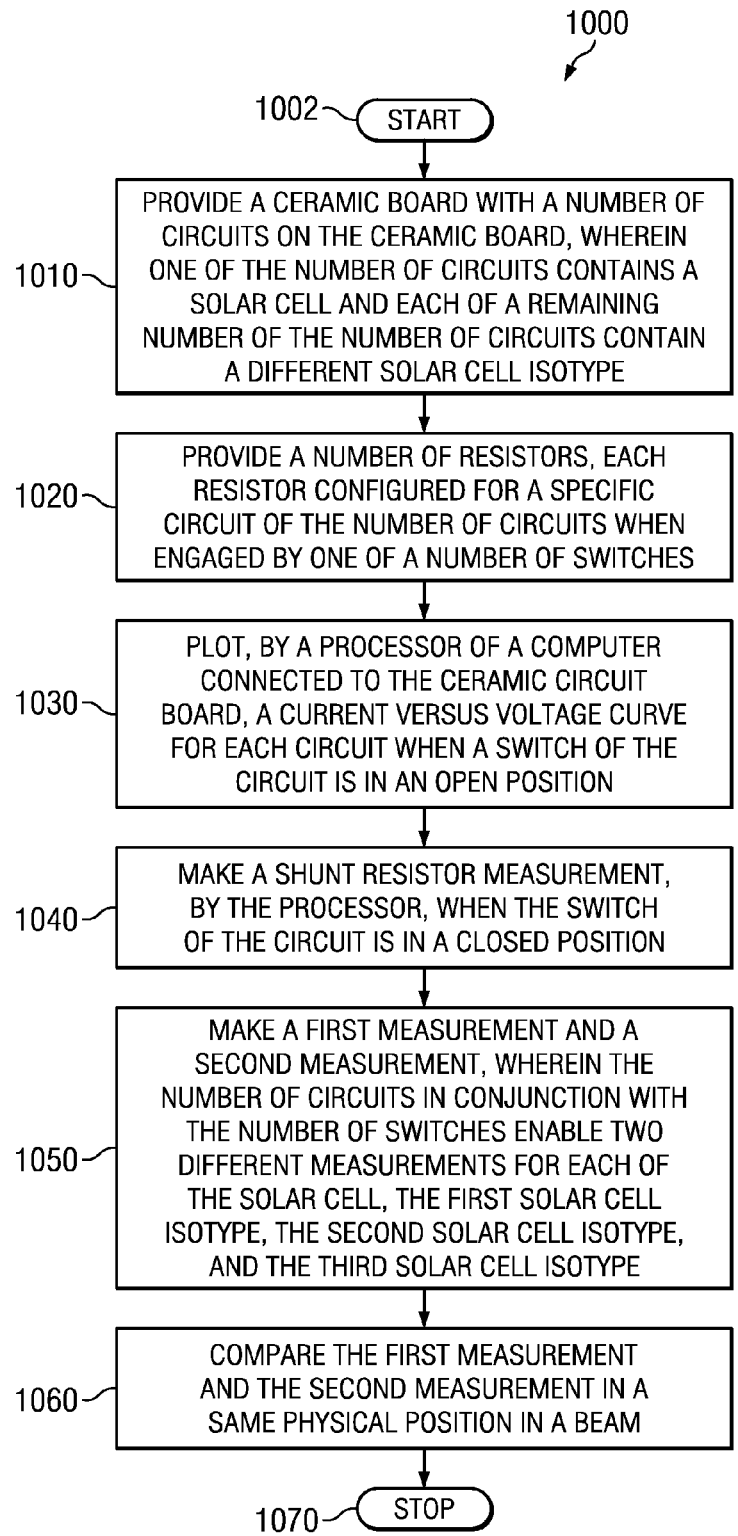
FIG. 10 is a flowchart of a method of testing a solar simulator in accordance with the illustrative embodiments.

Turning to FIG. 10, a flowchart of a method of testing a solar simulator in accordance with the illustrative embodiments is disclosed. Process 1000 starts (operation 1002) and provides a ceramic board with a number of circuits on the ceramic board, wherein one of the number of circuits contains a solar cell and each of a remaining number of the number of circuits contain a different solar cell isotype (operation 1010). The ceramic board may be a substrate such as 310 in FIGS. 2-9. Process 1000 provides a number of resistors, each resistor configured for a specific circuit of the number of circuits when engaged by one of a number of switches (operation 1020). The number of resistors may be resistors 610-640 in FIG. 7. The number of switches may be switches 910-940 in FIG. 9. Process 1000 plots a current versus voltage curve for each circuit when a switch of the circuit is in an open position (operation 1030). The open position may be, by way of example, as shown in FIG. 9 for switches 920, 920, and 940.

Process 1000 makes a shunt resistor measurement when the switch of the circuit is in a closed position (operation 1040). The closed position may be, by way of example, as shown in FIG. 9 for switch 910. Process 1000 makes a first measurement and a second measurement, wherein the number of circuits in conjunction with the number of switches enable two different measurements for each of the solar cell, the first solar cell isotype, the second solar cell isotype, and the third solar cell isotype (operation 1050). The solar cell may be full solar cell 356 in FIG. 4. The first solar cell isotype may be top isotype 350 in FIG. 4. The second solar cell isotype may be middle isotype 352 in FIG. 4. The third solar cell isotype may be bottom isotype 354 in FIG. 4. Process 1000 compares the first measurement and the second measurement in a same physical position in a beam (operation 1060). Beam may be incident light 230 in FIG. 2. Process 1000 stops (1070).

Figure 11A:
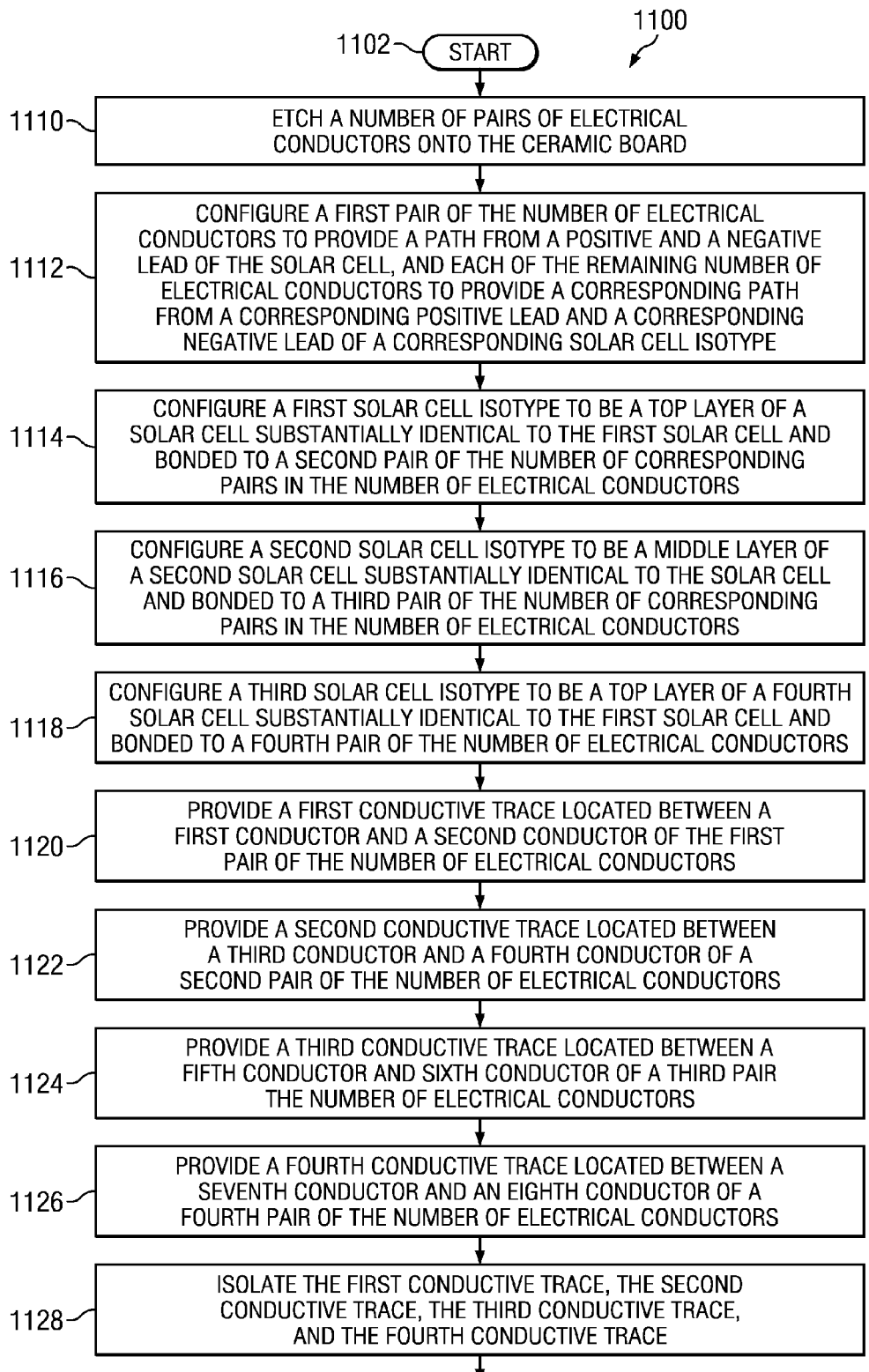
FIGS. 11A and 11B are a flow chart of a method for manufacturing a test device for a solar simulator in accordance with the illustrative embodiments.
Figure 11B:
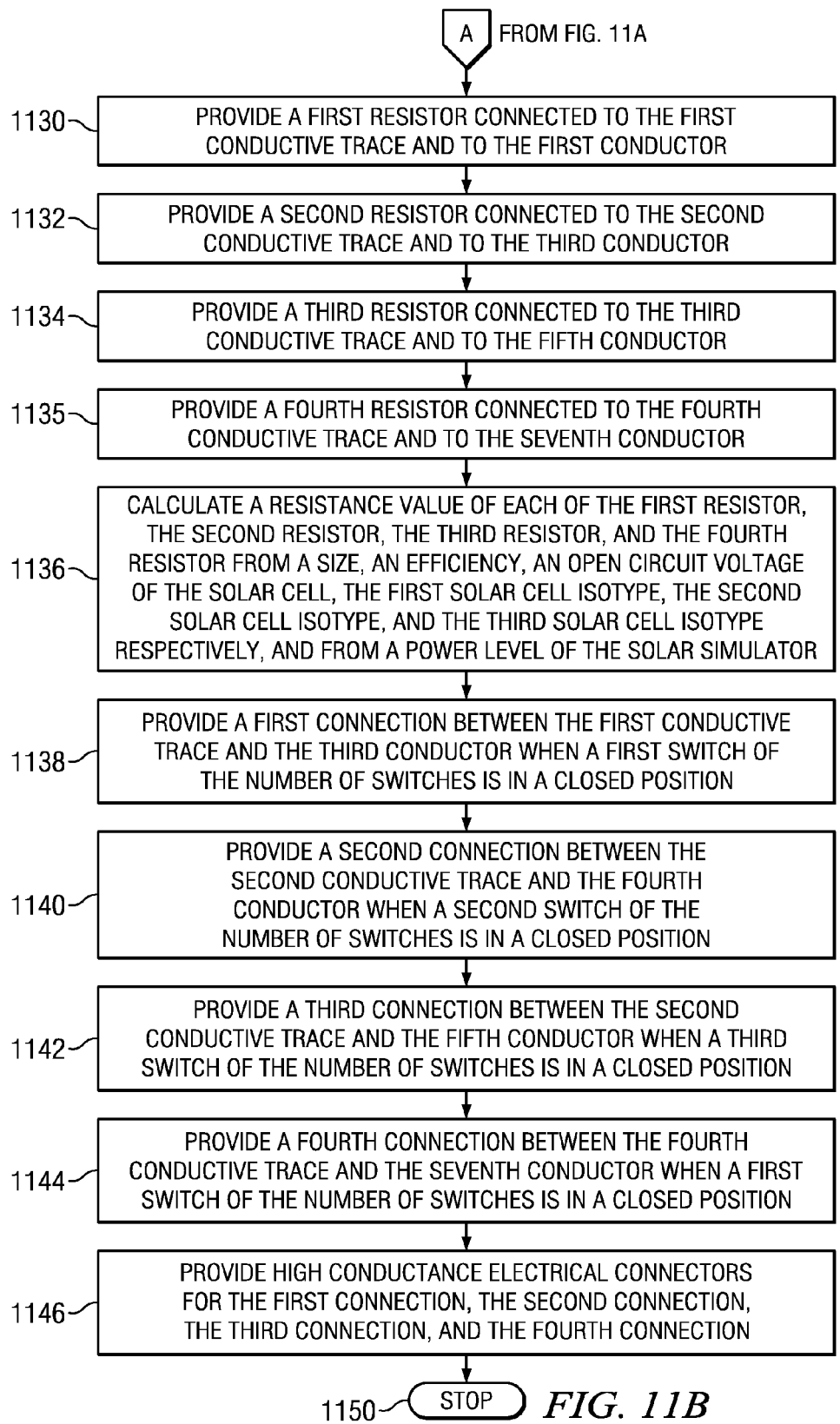

Turning to FIGS. 11A and 11B, a flow chart of a method for manufacturing a test device for a solar simulator in accordance with the illustrative embodiments is disclosed. Process 1100 starts (operation 1102) and etches a number of pairs of electrical conductors etched onto the ceramic board (operation 1110). Pairs of electrical conductors may be, by way of example, 320 and 322, 324 and 326, 328 and 330, and 332 and 334 in FIG. 3. Process 1100 configures a first pair of the number of electrical conductors to provide a path from a positive and a negative lead of the solar cell, and each of the remaining number of electrical conductors to provide a corresponding path from a corresponding positive lead and a corresponding negative lead of a corresponding solar cell isotype (operation 1112). By way of example, negative leads may be 320, 326, 328, and 334 in FIG. 7. By way of example, positive leads may be 322, 324, 330, and 332 in FIG. 7. Process 1100 configures a first solar cell isotoype to be a top layer of a solar cell substantially identical to the first solar cell and bonded to a second pair of the number of corresponding pairs in the number of electrical conductors (operation 1114). By way of example, the first solar cell isotype may be full isotype 356 in FIG. 7. Process 1100 configures a second solar cell isotype to be a middle layer of a second solar cell substantially identical to the solar cell and bonded to a third pair of the number of corresponding pairs in the number of electrical conductors (operation 1116). Process 1100 configures a third solar cell isotype to be a top layer of a fourth solar cell substantially identical to the first solar cell and bonded to a fourth pair of the number of electrical conductors (operation 1118). The first through the third solar cell isotypes may be top isotype 350, middle isotype 352, and bottom isotype 354 in FIG. 7.

Process 1100 provides a first conductive trace located between a first conductor and a second conductor of the first pair of the number of electrical conductors (operation 1120). Process 1100 provides a second conductive trace located between a third conductor and a fourth conductor of a second pair of the number of electrical conductors (operation 1122). Process 1100 provides a third conductive trace located between a fifth conductor and sixth conductor of a third pair the number of electrical conductors (operation 1124). Process 1100 provides a fourth conductive trace located between a seventh conductor and an eighth conductor of a fourth pair of the number of electrical conductors (operation 1126). The first through the fourth conductive traces may be conductive traces 336, 338, 340, and 342 in FIG. 7. Process isolates the first conductive trace, the second conductive trace, the third conductive trace, and the fourth conductive trace (operation 1128). Process 1100 provides a first resistor connected to the first conductive trace and to the first conductor (operation 1130). Process 1100 provides a second resistor connected to the second conductive trace and to the third conductor (operation 1132). Process 1100 provides a third resistor connected to the third conductive trace and to the fifth conductor (operation 1134). Process 1100 provides a fourth resistor connected to the fourth conductive trace and to the seventh conductor (operation 1135). The resistors may be resistors 610, 620, 630, and 640 in FIG. 7.

Process 1100 calculates a resistance value of each of the first resistor, the second resistor, the third resistor, and the fourth resistor from a size, an efficiency, an open circuit voltage of the solar cell, the first solar cell isotype, the second solar cell isotype, and the third solar cell isotype respectively, and from a power level of the solar simulator (operation 1136). Process 1100 provides a first connection between the first conductive trace and the third conductor when a first switch of the number of switches is in a closed position (operation 1138). Process 1100 provides a second connection between the second conductive trace between the second conductive trace and the fourth conductor when a second switch of the number of switches is in a closed position (operation 1140). Process 1100 provides a third connection between the second conductive trace and the fifth conductor when a third switch of the number of switches is in a closed position (operation 1142). Process 1100 provides a fourth connection between the fourth conductive trace and the seventh conductor when a first switch of the number of switches is in a closed position (operation 1144). By way of example, the switches may be switches 910, 920, 930, and 940 in FIG. 9. Process 1100 provides the first connection, the second connection, the third connection, and the fourth connection to be high conductance electrical connections (operation 1146).

Figure 12:
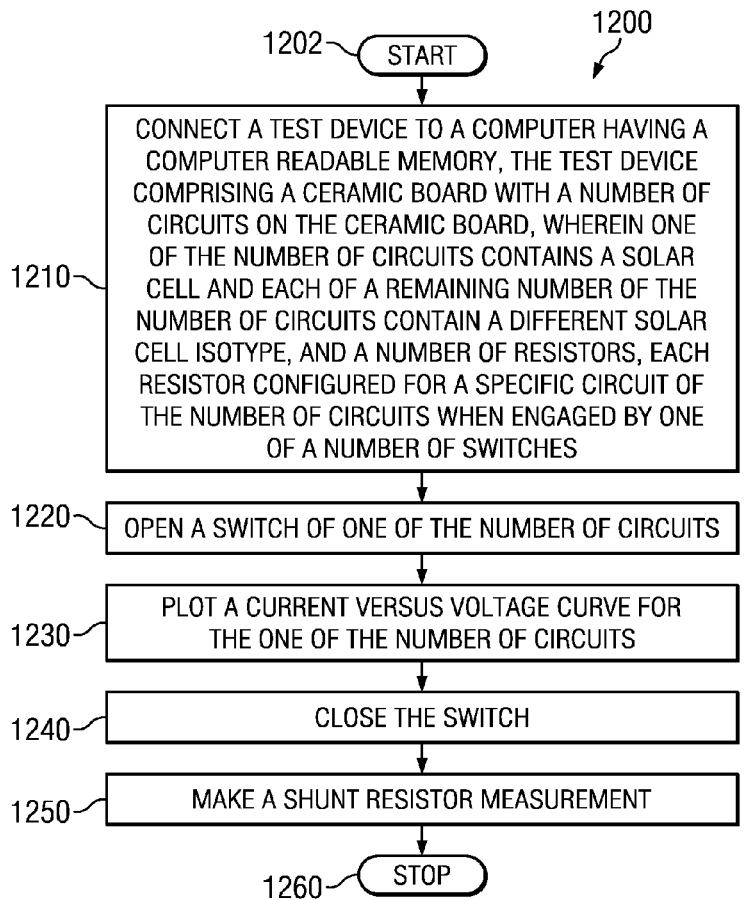
FIG. 12 is a flowchart of a process for automated testing of a solar simulator in accordance with the illustrative embodiments.

Turning to FIG. 12, a process for automated testing of a solar simulator is disclosed in accordance with an illustrative embodiment. Process 1200 starts (operation 1202) and connects a test device to a computer having a computer readable memory, the test device comprising a ceramic board with a number of circuits on the ceramic board, wherein one of the number of circuits contains a solar cell and each of a remaining number of the number of circuits contain a different solar cell isotype, and a number of resistors, each resistor configured for a specific circuit of the number of circuits when engaged by one of a number of switches (operation 1210). The test device may be sensor device 140 in FIG. 1. The test device may be circuit board 700 in FIG. 7 or circuit board in FIG. 9. Process 1200 opens a switch of one of the number of circuits (operation 1220). Process 1200, responsive to opening the switch, plots a current versus voltage curve for the one of the number of circuits (operation 1230). Process 1200 closes the switch (operation 1240). Process 1200, responsive to closing the switch, makes a shunt resistor measurement (operation 1250). Process 1200 stops (operation 1260).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 13:
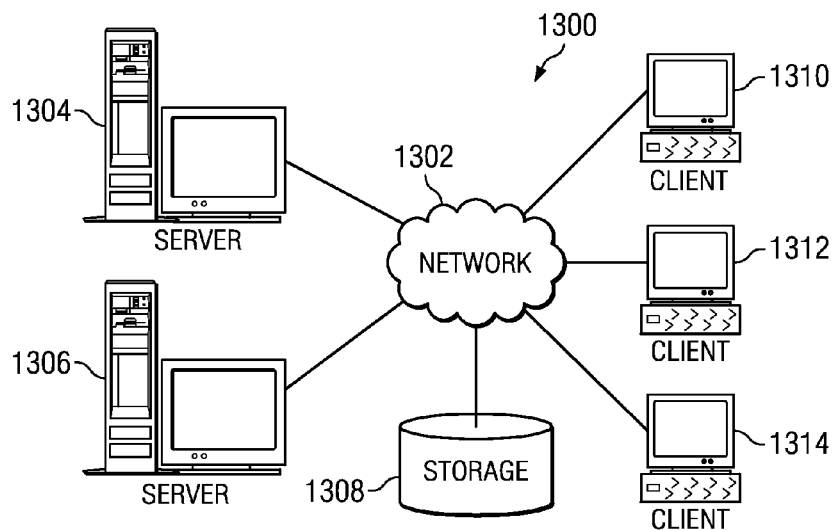
FIG. 13 is a pictorial representation of a network of data processing systems in which illustrative embodiments may be implemented.
Figure 14:
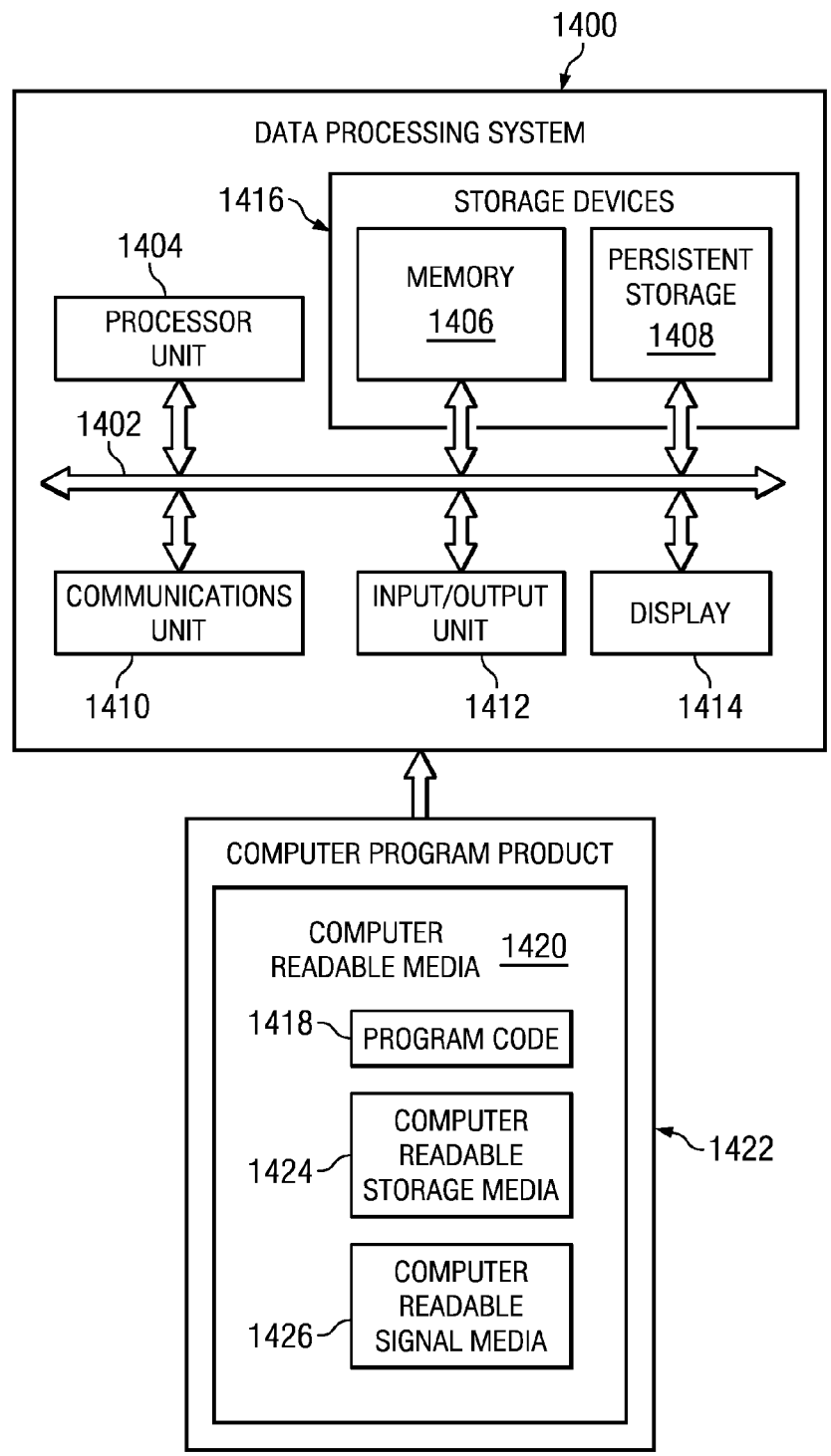
FIG. 14 is data processing system in which illustrative embodiments may be implemented.

With reference to FIGS. 13 and 14, exemplary diagrams of data processing environments are provided in which illustrative embodiments may be implemented. It should be appreciated that FIGS. 13 and 14 are only exemplary and are not intended to assert or imply any limitation with regard to the environments in which different embodiments may be implemented. Many modifications to the depicted environments may be made.

FIG. 13 depicts a pictorial representation of a network of data processing systems in which illustrative embodiments may be implemented. Network data processing system 1300 may be a network of computers in which the illustrative embodiments may be implemented. Network data processing system 1300 contains network 1302, which may be the medium used to provide communications links between various devices and computers connected together within network data processing system 1300. Network 1302 may include connections, such as wire, wireless communication links, or fiber optic cables.

In the depicted example, server 1304 and server 1306 connect to network 1302 along with storage unit 1308. In addition, clients 1310, 1312, and 1314 connect to network 1302. Clients 1310, 1312, and 1314 may be, for example, personal computers or network computers. In the depicted example, server 1304 provides information, such as boot files, operating system images, and applications to clients 1310, 1312, and 1314. Clients 1310, 1312, and 1314 are clients to server 1304 in this example. Network data processing system 1300 may include additional servers, clients, and other devices not shown.

Program code located in network data processing system 1300 may be stored on a computer recordable storage medium and downloaded to a data processing system or other device for use. For example, program code may be stored on a computer recordable storage medium on server 1304 and downloaded to client 1310 over network 1302 for use on client 1310.

In the depicted example, network data processing system 1300 is the Internet with network 1302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1300 also may be implemented as a number of different types of networks, such as for example, an intranet, a local area network (LAN), or a wide area network (WAN). FIG. 13 is intended as an example, and not as an architectural limitation for the different illustrative embodiments. FIG. 13 may be data processing system in which illustrative embodiments may be implemented.

With reference now to FIG. 14, a diagram of a data processing system is depicted in accordance with an illustrative embodiment. Data processing system 1400 is an example of a computer, such as server 1204 or client 1210 in FIG. 12, in which computer usable program code or instructions implementing the processes may be located for the illustrative embodiments. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a set of one or more processors or may be a multi-processor core, depending on the particular implementation. Further, processor unit 1404 may be implemented using one or more heterogeneous processor systems, in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Memory 1406, in these examples, may be, for example, a random access memory, or any other suitable volatile or non-volatile storage device. Persistent storage 1408 may take various forms, depending on the particular implementation. For example, persistent storage 1408 may contain one or more components or devices. For example, persistent storage 1408 may be a hard drive, a flash memory, a rewritable optical disk, a rewritable magnetic tape, or some combination of the above. The medium used by persistent storage 1408 may be removable. For example, a removable hard drive may be used for persistent storage 1408.

Communications unit 1410, in these examples, provides for communication with other data processing systems or devices. In these examples, communications unit 1410 is a network interface card. Communications unit 1410 may provide communications through the use of either or both physical and wireless communications links.

Input/output unit 1412 allows for the input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code, in the different embodiments, may be embodied on different physical or computer readable storage medium, such as memory 1406 or persistent storage 1408.

Program code 1418 is located in a functional form on computer readable medium 1420 that is selectively removable and may be loaded onto or transferred to data processing system 1400 for execution by processor unit 1404. Program code 1418 and computer readable medium 1420 form computer program product 1422. In one example, computer readable medium 1420 may be computer readable storage medium 1424 or computer readable signal medium 1426. Computer readable storage medium 1424 may include, for example, an optical or magnetic disc that is inserted or placed into a drive or other device that is part of persistent storage 1408 for transfer onto a storage device, such as a hard drive, that is part of persistent storage 1408. Computer readable storage medium 1424 also may take the form of a persistent storage, such as a hard drive, a thumb drive, or a flash memory that is connected to data processing system 1400. In some instances, computer readable storage medium 1424 may not be removable from data processing system 1400.

Alternatively, program code 1418 may be transferred to data processing system 1400 using computer readable signal medium 1426. Computer readable signal medium 1426 may be, for example, a propagated data signal containing program code 1418. For example, computer readable signal medium 1426 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable medium also may take the form of non-tangible medium, such as communications links or wireless transmissions containing the program code.

In some illustrative embodiments, program code 1418 may be downloaded over a network to persistent storage 1408 from another device or data processing system through computer readable signal medium 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of executing program code. As one example, data processing system 1400 may include organic components integrated with inorganic components and/or may be comprised entirely of organic components excluding a human being. For example, a storage device may be comprised of an organic semiconductor.

As another example, a storage device in data processing system 1400 is any hardware apparatus that may store data. Memory 1406, persistent storage 1408, and computer readable medium 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406 or a cache such as found in an interface and memory controller hub that may be present in communications fabric 1402.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for testing a solar simulator, the apparatus comprising:
    a ceramic board;
    a number of circuits on the ceramic board, wherein one of the number of circuits contains a solar cell and each of a remaining number of the number of circuits contains a different solar cell isotype; and
    a number of resistors, each resistor configured for a specific circuit of the number of circuits when engaged by one of a number of switches;
    wherein the apparatus plots a current versus voltage curve for each circuit when a switch of the circuit is in an open position and a shunt resistor measurement when the switch of the circuit is in a closed position;
    wherein the number of circuits further comprise a number of pairs of electrical conductors etched onto the ceramic board;
    wherein a first pair of the number of electrical conductors is configured to provide a path from a positive and a negative lead of the solar cell, and each of a remaining number of electrical conductors is configured to provide a corresponding path from a corresponding positive lead and a corresponding negative lead of a corresponding solar cell isotype; and wherein a number of solar cell isotypes comprises:
a first solar cell isotype comprising a top layer of a solar cell substantially identical to the first solar cell and bonded to a second pair of a number of corresponding pairs in the number of electrical conductors.

2. The apparatus of claim 1, wherein the number of solar cell isotypes comprises:
a second solar cell isotype comprising a middle layer of a second solar cell substantially identical to the solar cell and bonded to a third pair of the number of corresponding pairs in the number of electrical conductors.

3. The apparatus of claim 1, wherein the number of solar cell isotypes comprise:
a third solar cell isotype comprising a top layer of a fourth solar cell substantially identical to the first solar cell and bonded to a fourth pair of the number of electrical conductors.

4. The apparatus of claim 1 further comprising:
a first conductive trace located between a first conductor and a second conductor of the first pair of the number of electrical conductors;
a second conductive trace located between a third conductor and a fourth conductor of a second pair of the number of electrical conductors;
a third conductive trace located between a fifth conductor and sixth conductor of a third pair the number of electrical conductors; and
a fourth conductive trace located between a seventh conductor and an eighth conductor of a fourth pair of the number of electrical conductors;
wherein the first conductive trace, the second conductive trace, the third conductive trace, and the fourth conductive trace are isolated.

5. The apparatus of claim 4 further comprising:
a first resistor connected to the first conductive trace and to the first conductor;
a second resistor connected to the second conductive trace and to the third conductor;
a third resistor connected to the third conductive trace and to the fifth conductor;
a fourth resistor connected to the fourth conductive trace and to the seventh conductor;
wherein a resistance value of each of the first resistor, the second resistor, the third resistor, and the fourth resistor is calculated from a size, an efficiency, an open circuit voltage of the solar cell, the first solar cell isotype, a second solar cell isotype, and a third solar cell isotype respectively, and from a power level of the solar simulator.

6. The apparatus of claim 5 further comprising:
a first connection between the first conductive trace and the third conductor when a first switch of the number of switches is in a closed position;
a second connection between the second conductive trace between the second conductive trace and the fourth conductor when a second switch of the number of switches is in a closed position;
a third connection between the second conductive trace and the fifth conductor when a third switch of the number of switches is in a closed position; and
a fourth connection between the fourth conductive trace and the seventh conductor when a first switch of the number of switches is in a closed position;
wherein the first connection, the second connection, the third connection, and the fourth connection are high conductance electrical connections.

7. The apparatus of claim 6 further comprising:
wherein the number of circuits in conjunction with the number of switches enable two different measurements for each of the solar cell, the first solar cell isotype, the second solar cell isotype, and the third solar cell isotype; and
wherein a comparison between a first measurement and a second measurement using the apparatus in a same physical position in a beam is enabled.

8. A method for testing a solar simulator, the method comprising:
providing a ceramic board with a number of circuits on the ceramic board, wherein one of the number of circuits contains a solar cell and each of a remaining number of the number of circuits contain a different solar cell isotype;
providing a number of resistors, each resistor configured for a specific circuit of the number of circuits when engaged by one of a number of switches;
plotting, by a processor of a computer connected to the ceramic circuit board, a current versus voltage curve for each circuit when a switch of the circuit is in an open position;
making a shunt resistor measurement, by the processor, when the switch of the circuit is in a closed position;
making a first measurement and a second measurement, wherein the number of circuits in conjunction with the number of switches enable two different measurements for each of the solar cell, a first solar cell isotype, a second solar cell isotype, and a third solar cell isotype; and
comparing the first measurement and the second measurement in a same physical position in a beam.

9. The method of claim 8 further comprising:
etching a number of pairs of electrical conductors onto the ceramic board; and
configuring a first pair of the number of electrical conductors to provide a path from a positive and a negative lead of the solar cell, and each of the remaining number of electrical conductors to provide a corresponding path from a corresponding positive lead and a corresponding negative lead of a corresponding solar cell isotype.

10. The method of claim 9 further comprising:
configuring a first solar cell isotoype to be a top layer of a solar cell substantially identical to the first solar cell and bonded to a second pair of the number of corresponding pairs in the number of electrical conductors;
configuring a second solar cell isotype to be a middle layer of a second solar cell substantially identical to the solar cell and bonded to a third pair of the number of corresponding pairs in the number of electrical conductors; and
configuring a third solar cell isotype to be a top layer of a fourth solar cell substantially identical to the first solar cell and bonded to a fourth pair of the number of electrical conductors.

11. The method of claim 9 further comprising:
providing a first conductive trace located between a first conductor and a second conductor of the first pair of the number of electrical conductors;
providing a second conductive trace located between a third conductor and a fourth conductor of a second pair of the number of electrical conductors;
providing a third conductive trace located between a fifth conductor and sixth conductor of a third pair the number of electrical conductors; and providing a fourth conductive trace located between a seventh conductor and an eighth conductor of a fourth pair of the number of electrical conductors;

wherein the first conductive trace, the second conductive trace, the third conductive trace, and the fourth conductive trace are isolated.

12. The method of claim 11 further comprising:

providing a first resistor connected to the first conductive trace and to the first conductor;

providing a second resistor connected to the second conductive trace and to the third conductor;

providing a third resistor connected to the third conductive trace and to the fifth conductor;

providing a fourth resistor connected to the fourth conductive trace and to the seventh conductor; and calculating a resistance value of each of the first resistor, the second resistor, the third resistor, and the fourth resistor from a size, an efficiency, an open circuit voltage of the solar cell, the first solar cell isotype, the second solar cell isotype, and the third solar cell isotype respectively, and from a power level of the solar simulator.

13. The method of claim 12 further comprising:

providing a first connection between the first conductive trace and the third conductor when a first switch of the number of switches is in a closed position;

providing a second connection between the second conductive trace between the second conductive trace and the fourth conductor when a second switch of the number of switches is in a closed position;

providing a third connection between the second conductive trace and the fifth conductor when a third switch of the number of switches is in a closed position; and providing a fourth connection between the fourth conductive trace and the seventh conductor when a first switch of the number of switches is in a closed position;

wherein the first connection, the second connection, the third connection, and the fourth connection are high conductance electrical connections.

14. A computer program product, comprising:

a non-transitory computer readable storage medium;

first instructions for connecting a test device to a computer having a computer readable memory, the test device comprising a ceramic board with a number of circuits on the ceramic board, wherein one of the number of circuits contains a solar cell and each of a remaining number of the number of circuits contain a different solar cell isotype, and a number of resistors, each resistor configured for a specific circuit of the number of circuits when engaged by one of a number of switches;

second instructions for opening a switch of one of the number of circuits;

responsive to opening the switch, third instructions for plotting a current versus voltage curve for the one of the number of circuits; and fourth instructions for closing the switch; and responsive to closing the switch, fifth instructions for making a shunt resistor measurement.

* * * * *